US012651603B2

(12) United States Patent (10) Patent No.: US 12,651,603 B2

Kang (45) Date of Patent: Jun. 9, 2026

(54) METHOD AND DEVICE FOR CONTROLLING MICROPHONE INPUT SIGNAL IN VEHICLE

(71) Applicants:Hyundai Motor Company, Seoul (KR); Kia Corporation, Seoul (KR)

(72) Inventor: Hae Sung Kang, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 145 days.

(21) Appl. No.: 18/654,580

(22) Filed: May 3, 2024

(65) Prior Publication Data

US 2025/0131935 A1 Apr. 24, 2025

(30) Foreign Application Priority Data

Oct. 23, 2023 (KR) ........................ 10-2023-0142105

(51) Int. Cl.
G10L 21/0208 (2013.01)
H04M 9/08 (2006.01)
(52) U.S. Cl.
CPC ......... G10L 21/0208 (2013.01); H04M 9/082 (2013.01); *G10L 2021/02082* (2013.01)

(58) Field of Classification Search
USPC ...................................................... 704/1–504
See application file for complete search history.

(56) References Cited

U.S. PATENT DOCUMENTS

| | | | |
|---|---|---|---|
| 11,276,414 B2 * | 3/2022 | Yang ........................ | G10L 25/30 |
| 2019/0035418 A1 * | 1/2019 | Takashima .......... | G10L 21/0272 |
| 2020/0098355 A1 * | 3/2020 | Lee ................... | G10K 11/17885 |
| 2020/0251119 A1 * | 8/2020 | Yang ................... | G10L 21/0272 |
| 2025/0131935 A1 * | 4/2025 | Kang ................... | G10L 21/0208 |
| 2025/0292759 A1 * | 9/2025 | Mani ................ | G10K 11/17881 |

FOREIGN PATENT DOCUMENTS

| | | | | |
|---|---|---|---|---|
| CN | 120431940 A | * | 8/2025 | ......... G10L 21/0208 |

* cited by examiner

*Primary Examiner* — Marcus T Riley
(74) *Attorney, Agent, or Firm* — Slater Matsil, LLP

(57) ABSTRACT

An embodiment method of controlling a microphone input signal in a vehicle includes receiving a sound signal from an external server or an external device, generating a first reference signal based on the sound signal and generating a second reference signal based on a signal obtained by removing noise from the sound signal and performing equalization, receiving the microphone input signal through a microphone, and removing an echo from the microphone input signal using the first reference signal or the second reference signal based on a result of comparison between the first reference signal and the second reference signal.

20 Claims, 6 Drawing Sheets

_600_

METHOD AND DEVICE FOR CONTROLLING MICROPHONE INPUT SIGNAL IN VEHICLE

CROSS-REFERENCE TO RELATED APPLICATIONS

This application claims the benefit of Korean Patent Application No. 10-2023-0142105, filed on Oct. 23, 2023, which application is hereby incorporated herein by reference.

TECHNICAL FIELD

The present disclosure relates to sound control.

BACKGROUND

In general, many devices are installed in a vehicle, and recently, devices for the convenience of drivers and passengers have been steadily developed and installed. Representative examples include audio devices and air conditioning devices, and the number of vehicles equipped with navigation systems that determine the location of a vehicle through satellites and provide guidance on a route to a destination is also increasing.

However, although such convenience devices provide various conveniences to drivers and passengers, there is a problem that the driver's concentration on driving decreases and the driver becomes distracted while operating convenience devices while driving, increasing the risk of an accident occurring.

To solve this problem, hands-free functions linked to mobile phones in vehicles, wake-up command technology for controlling various convenience devices according to a driver's voice commands by recognizing the driver's voice without the need to directly operate the convenience devices, barge-in technology for preventing voice misrecognition when a voice is output by removing echo and recognizing only the user's voice, and the like have recently been developed.

In particular, in order to implement these technologies, an echo canceller in a vehicle performs a function of removing only sound output through a speaker when the sound output through the speaker and the driver's voice are combined and input through a microphone. In order to effectively remove sound output through a speaker, information on volume and frequency needs to be accurately transmitted to the echo canceller, and this signal is called a reference signal.

However, if an accurate reference signal is not transmitted, there is a problem in that an echo occurs and the driver's voice is not accurately transmitted. Therefore, in this technical field, there is a demand for technology by which the reference signal can be strengthened and echo occurrence can be curbed to accurately transmit the driver's voice.

SUMMARY

The present disclosure relates to sound control. Particular embodiments relate to a method and system for removing a signal output through a speaker from a signal input through a microphone in a vehicle and transmitting the resultant signal to the outside.

Therefore, embodiments of the present disclosure address problems in the art, and embodiments of the present disclosure provide a method and system for controlling a microphone input signal in a vehicle which can accurately transmit a driver's voice by strengthening a reference signal and curbing echo occurrence.

The embodiments of the present disclosure are not limited to the embodiments mentioned above, and other embodiments not mentioned will be clearly understood by those skilled in the art from the following description.

In accordance with embodiments of the present disclosure, the above and other features can be accomplished by the provision of a method of controlling a microphone input signal in a vehicle, the method including receiving a sound signal from an external server or an external device, generating a first reference signal based on the sound signal and generating a second reference signal based on a signal obtained by removing noise from the sound signal and performing equalization, receiving a microphone input signal through a microphone, and removing echo from the microphone input signal using the first or second reference signal on the basis of a result of comparison between the first and second reference signals.

Here, the first and second reference signals may be complex numbers including a real part and an imaginary part, and the removing of echo from the microphone input signal may include removing the echo from the microphone input signal using the first or second reference signal on the basis of a result of comparison between an absolute value of the first reference signal and an absolute value of the second reference signal.

Here, the removing of echo from the microphone input signal may include removing the echo from the microphone input signal using the second reference signal if a value obtained by subtracting the absolute value of the first reference signal from the absolute value of the second reference signal is equal to or greater than 0.

Here, the removing of echo from the microphone input signal may include removing the echo from the microphone input signal using the first reference signal if the value obtained by subtracting the absolute value of the first reference signal from the absolute value of the second reference signal is less than 0.

Here, the removing of echo from the microphone input signal may include removing the echo from the microphone input signal using the first or second reference signal on the basis of a result of comparison between a decibel value (dB) of the first reference signal and a decibel value (dB) of the second reference signal.

Here, the removing of echo from the microphone input signal may include removing the echo from the microphone input signal using the second reference signal if a value obtained by subtracting the decibel value of the first reference signal from the decibel value of the second reference signal is equal to or greater than 0.

Here, the removing of echo from the microphone input signal may include removing the echo from the microphone input signal using the first reference signal if a value obtained by subtracting the decibel value of the first reference signal from the decibel value of the second reference signal is less than 0.

Here, the method may further include performing noise removal and equalization processing on a signal obtained by removing the echo from the microphone input signal.

Here, the method may further include transmitting the signal on which noise removal and equalization processing have been performed to the external server or the external device.

Here, the method may further include executing a voice command on the basis of the signal on which noise removal and equalization processing have been performed.

In accordance with another embodiment of the present disclosure, there is provided a device for controlling a microphone input signal, including an input/output unit configured to receive a sound signal from an external server or an external device and to receive a microphone input signal through a microphone, and a processor configured to generate a first reference signal based on the sound signal, to generate a second reference signal based on a signal obtained by removing noise from the sound signal and performing equalization, and to remove echo from the microphone input signal using the first or second reference signal on the basis of a result of comparison between the first and second reference signals.

Here, the first and second reference signals may be complex numbers including a real part and an imaginary part, and the processor may be configured to remove the echo from the microphone input signal using the first or second reference signal on the basis of a result of comparison between an absolute value of the first reference signal and an absolute value of the second reference signal.

Here, the processor may be configured to remove the echo from the microphone input signal using the second reference signal if a value obtained by subtracting the absolute value of the first reference signal from the absolute value of the second reference signal is equal to or greater than 0.

Here, the processor may be configured to remove the echo from the microphone input signal using the first reference signal if the value obtained by subtracting the absolute value of the first reference signal from the absolute value of the second reference signal is less than 0.

Here, the processor may be configured to remove the echo from the microphone input signal using the first or second reference signal on the basis of a result of comparison between a decibel value (dB) of the first reference signal and a decibel value (dB) of the second reference signal.

Here, the processor may be configured to remove the echo from the microphone input signal using the second reference signal if a value obtained by subtracting the decibel value of the first reference signal from the decibel value of the second reference signal is equal to or greater than 0.

Here, the processor may be configured to remove the echo from the microphone input signal using the first reference signal if a value obtained by subtracting the decibel value of the first reference signal from the decibel value of the second reference signal is less than 0.

Here, the processor may be configured to perform noise removal and equalization processing on a signal obtained by removing the echo from the microphone input signal.

Here, the processor may be configured to transmit the signal on which noise removal and equalization processing have been performed to the external server or the external device.

Here, the processor may be configured to execute a voice command on the basis of the signal on which noise removal and equalization processing have been performed.

BRIEF DESCRIPTION OF THE DRAWINGS

The above and other objects, features, and other advantages of embodiments of the present disclosure will be more clearly understood from the following detailed description taken in conjunction with the accompanying drawings, in which.

DETAILED DESCRIPTION OF ILLUSTRATIVE EMBODIMENTS

Reference will now be made in detail to the embodiments of the present disclosure, examples of which are illustrated in the accompanying drawings. Wherever possible, the same reference numbers will be used throughout the drawings to refer to the same or like parts.

The suffixes "module" and "unit" of elements herein are used for convenience of description and thus can be used interchangeably and do not have any distinguishable meanings or functions. In the following description of the embodiments disclosed in the present specification, a detailed description of known functions and configurations incorporated herein will be omitted when it may obscure the subject matter of the present disclosure. In addition, the accompanying drawings are provided only for ease of understanding of the embodiments disclosed in the present specification, do not limit the technical spirit disclosed herein, and include all changes, equivalents, and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is intended to include a plurality of elements unless the context clearly indicates otherwise.

In the present specification, it will be further understood that the term "comprise" or "include" specifies the presence of a stated feature, figure, step, operation, component, part, or combination thereof, but does not preclude the presence or addition of one or more other features, figures, steps, operations, components, parts, or combinations thereof.

Figure 1:
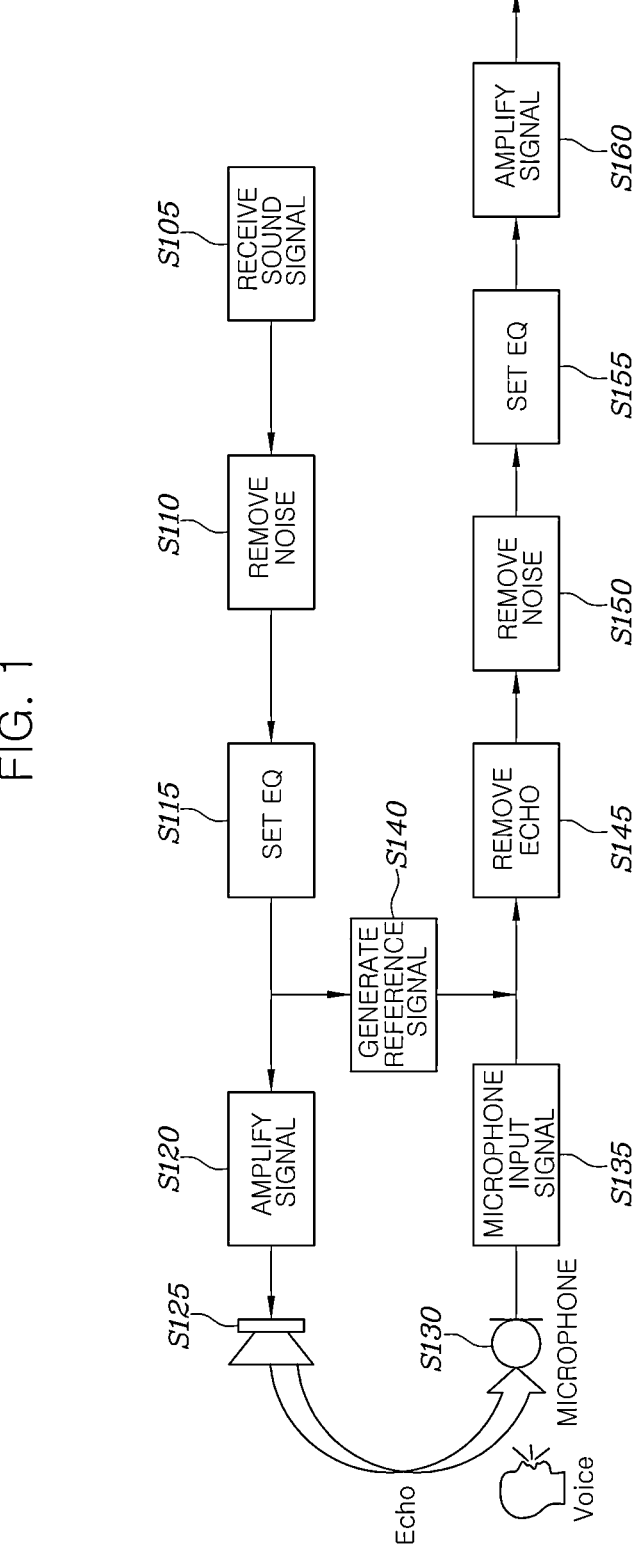
FIG. 1 schematically shows a process in which sound output is controlled in a typical audio video navigation (AVN) system in a vehicle.

FIG. 1 schematically shows a process in which sound output is controlled in a typical audio video navigation (AVN) system in a vehicle.

Referring to FIG. 1, the AVN system receives a sound signal through a communication module or the like (S105).

For example, the communication module may be a wireless communication module using RF communication technologies such as Wi-Fi, Bluetooth, mobile communication, a local area network (LAN), a wide area network (WAN), infrared (IrDA), UHF, and VHF, or a wired communication module using wired communication technology using a 3.5 pi cable, USBZ-C cable, etc.

Additionally, the AVN system removes noise from the received sound signal (S110), sets equalization (EQ) (S115), amplifies the signal (S120), and outputs the amplified signal through a speaker (S125).

At this time, sound output through the speaker may be mixed with a passenger's voice or the like and input to a microphone (S130).

However, if the signal input to the microphone is mixed with the sound output through the speaker and input as a voice command or if a voice is transmitted during a call, the system may not be able to accurately recognize the voice command or a voice with echo may be transmitted to the other party of the call.

Therefore, when a microphone input signal is generated on the basis of the voice signal received by the microphone (S135), echo corresponding to the output sound of the speaker can be removed on the basis of the microphone input signal and a reference signal (S145).

Here, the reference signal generated in step S140 may be generated on the basis of the sound signal for which equalization (EQ) has been set.

When the echo is removed in step S145, the AVN system generates an output signal by removing noise (S150), performing equalization (EQ), and amplifying the signal (S160).

The output signal generated in this manner may be transmitted to an external device or an external server, or it may be used to execute a voice command within the AVN system.

Figure 2:
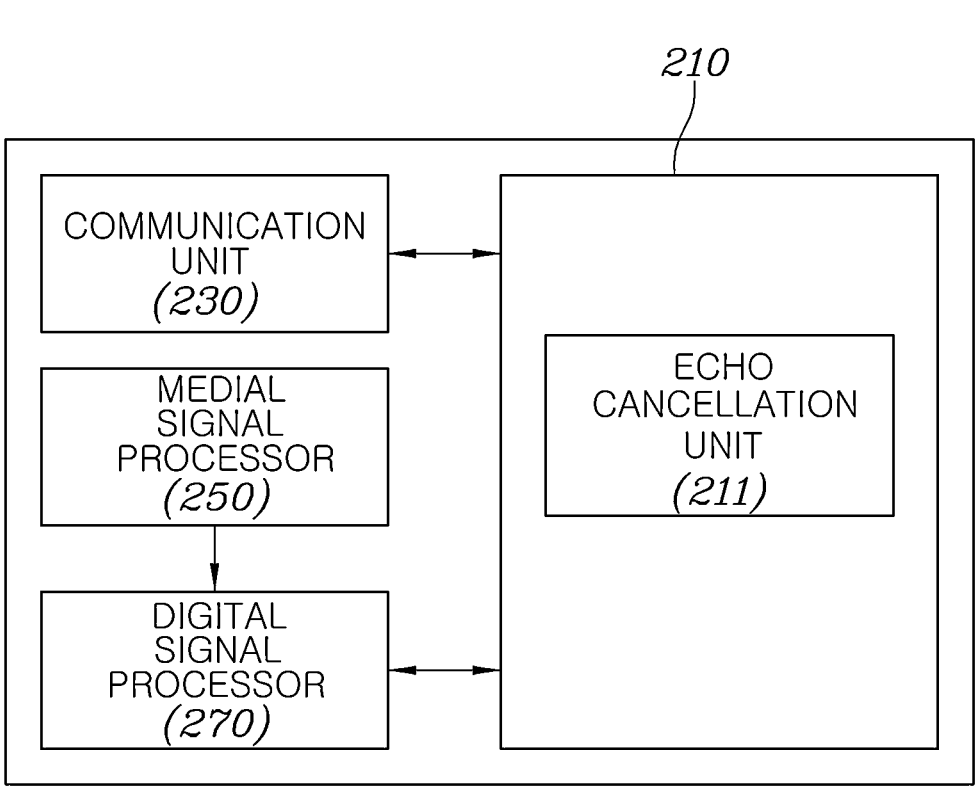
FIG. 2 is a block diagram schematically showing a microphone input signal control device according to an embodiment of the present disclosure.

FIG. 2 is a block diagram schematically showing a microphone input signal control device according to an embodiment of the present disclosure.

Referring to FIG. 2, the microphone input signal control device according to the present embodiment includes an echo cancellation and noise reduction unit 210, a communication unit 230, a media signal processor 250, and a digital signal processor 270.

The echo cancellation and noise reduction unit 210 removes echo from a mixed signal received through a microphone (not shown) and reduces noise therein on the basis of a reference signal generated based on a sound signal received through the communication unit 230.

The echo cancellation and noise reduction unit 210 may be provided in the form of a single chipset or an integrated module in which a single chipset and software are combined, for example, in the form of an echo cancellation noise reduction (ECNR) chip or an ECNR module.

Here, the echo cancellation and noise reduction unit 210 may include an echo cancellation unit 211.

The echo cancellation unit 211 removes echo from the mixed signal received through the microphone (not shown) on the basis of the reference signal.

At this time, the reference signal may include first and second reference signals.

The echo cancellation unit 211 can generate a delta value on the basis of a result of comparison between the first and second reference signals and remove echo on the basis of the first or second reference signal in response to the delta value.

Figure 3:
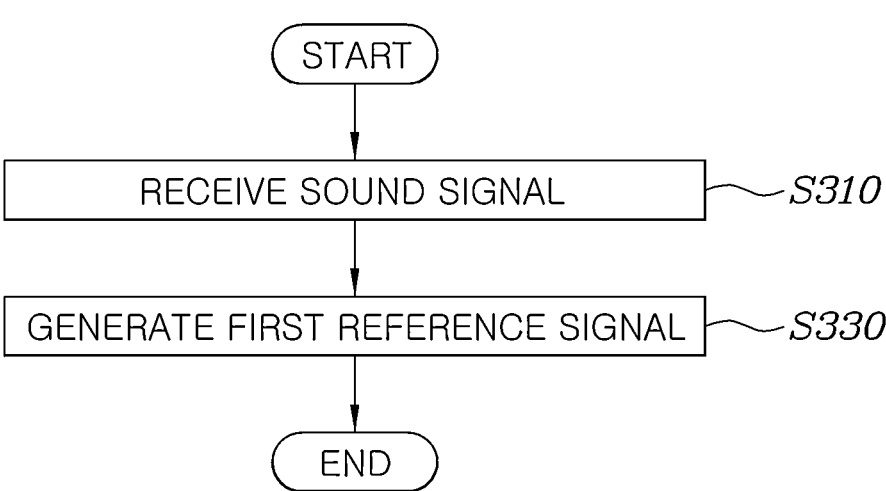
FIG. 3 is a flowchart showing a method of generating a first reference signal according to an embodiment of the present disclosure.
Figure 4:
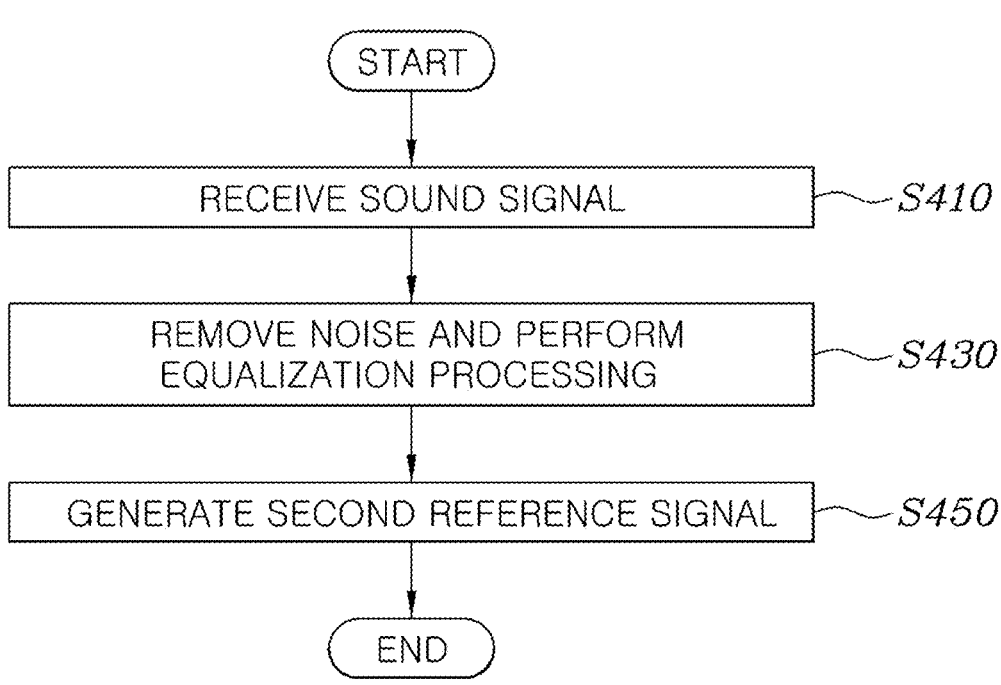
FIG. 4 is a flowchart showing a method of generating a second reference signal according to an embodiment of the present disclosure.

Here, the first reference signal may be generated by performing steps shown in FIG. 3, and the second reference signal may be generated by performing steps shown in FIG. 4.

Referring to FIG. 3, the microphone input signal control device 200 may receive a sound signal (S310) and generate the first reference signal based on the received sound signal (S330).

Here, step S310 may be performed by the communication unit 230, and step S330 may be performed by the echo cancellation and noise reduction unit 210.

Here, the signal received in step S310 may be defined as an RxIn (Receiver In) signal.

Referring to FIG. 4, the microphone input signal control device 200 receives a sound signal (S410), performs noise removal and equalization (EQ) processing (S430), and generates the second reference signal based on the noise-removed and equalized signal (S450).

Here, step S410 may be performed by the communication unit 230, step S430 may be performed by the media signal processor 250, and step S450 may be performed by either the media signal processor 250 or the digital signal processor 270.

Here, the signal on which noise removal and equalization (EQ) processing has been performed in step S430 may be defined as an AUDIO digital signal process (DSP) signal.

Referring back to FIG. 2, the communication unit 230 receives a sound signal from an external server or an external device.

Here, the communication unit 230 may include a wireless communication module using RF communication technologies such as Wi-Fi, Bluetooth, mobile communication, a local area network (LAN), a wide area network (WAN), infrared (IrDA), UHF, and VHF and/or a wired communication module using wired communication technology using a 3.5 pi cable, USBZ-C cable, etc.

The media signal processor 250 removes noise from the sound signal received through the communication unit 230 or an audio signal input through a microphone (not shown) and performs equalization (EQ).

Here, the media signal processor 250 may generate the second reference signal based on the signal on which noise removal and equalization (EQ) have been performed.

The digital signal processor 270 converts the signal on which noise removal and equalization have been performed by the media signal processor 250 into a digital signal.

Here, the digital signal processor 270 may generate the second reference signal based on the sound signal converted into a digital signal.

The digital signal processor 270 may be provided in the form of a single chipset or an integrated module in which a single chipset and software are combined, for example, it may be provided as a digital signal processor (DSP) chip or a DSP module.

Figure 5:
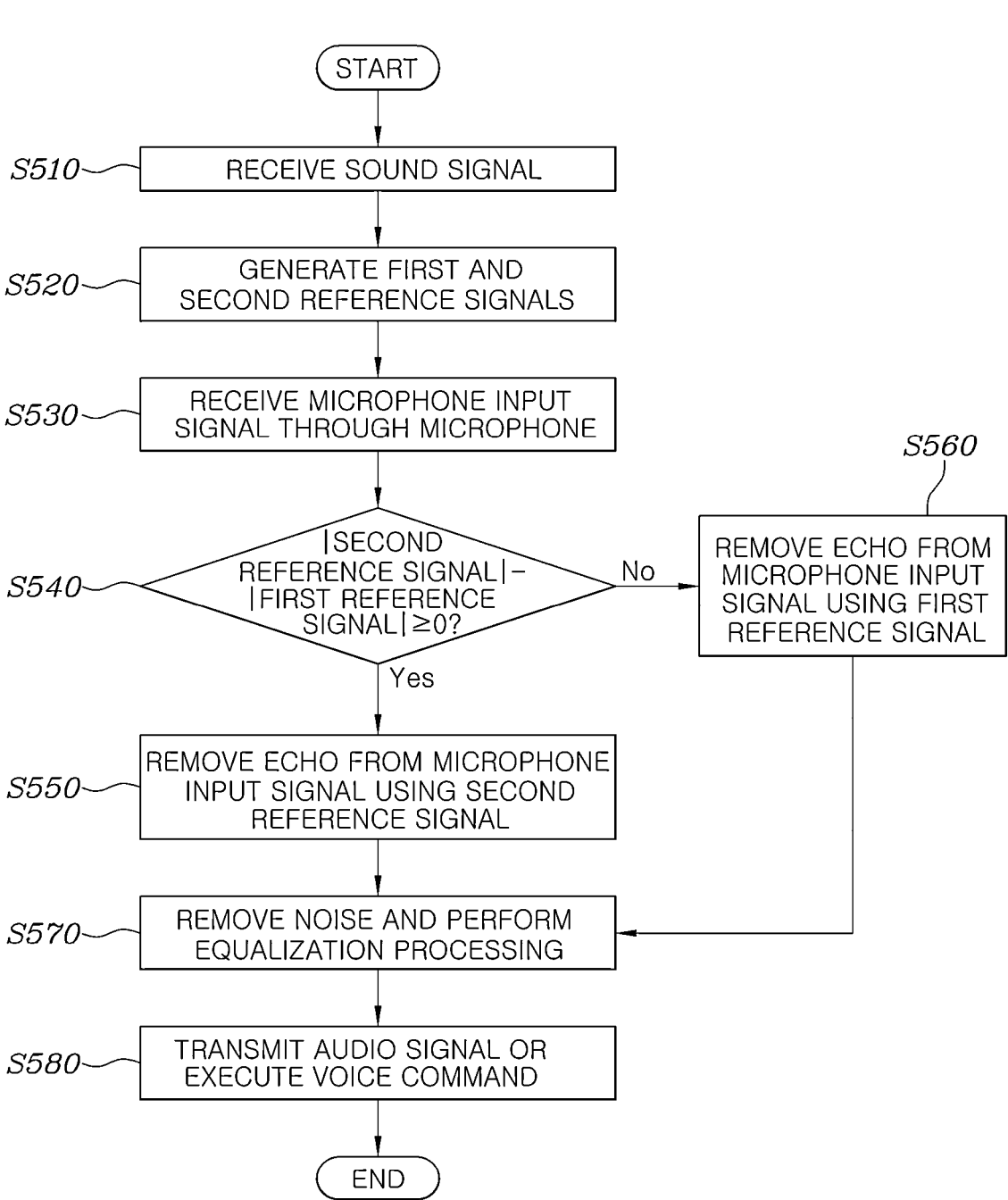
FIG. 5 is a flowchart showing a method of controlling a microphone input signal according to an embodiment of the present disclosure.

FIG. 5 is a flowchart showing a method of controlling a microphone input signal according to an embodiment of the present disclosure.

The method of controlling a microphone input signal according to the present embodiment can be performed by the microphone input signal control device 200 of FIG. 2.

Referring to FIG. 5, the microphone input signal control device 200 receives a sound signal from an external server or an external device (S510).

For example, the microphone input signal control device 200 may receive a sound signal from user equipment connected to an AVN system of a vehicle through Bluetooth communication.

Further, the microphone input signal control device 200 generates the first and second reference signals (S520).

Here, the first reference signal may be generated by the process according to the embodiment shown in FIG. 3, and the second reference signal may be generated by the process according to the embodiment shown in FIG. 4.

Additionally, the microphone input signal control device 200 receives a microphone input signal through a microphone (not shown) (S530).

At this time, the microphone may receive sound signals inside the vehicle periodically, continuously, or at any time according to user input.

In addition, the microphone input signal control device 200 determines whether a value obtained by subtracting the absolute value of the first reference signal from the absolute value of the second reference signal is equal to or greater than 0 (S540).

The first reference signal and the second reference signal may be complex numbers composed of a real part and an imaginary part, and it can be determined whether the value obtained by subtracting the absolute value of the second reference signal from the absolute value of the first reference signal is equal to or greater than 0.

Further, the first reference signal and the second reference signal may have decibel values (dB) indicating the loudness of the sound, and it can be determined whether the signal obtained by subtracting the decibel value of the second reference signal from the decibel value of the first reference signal is equal to or greater than 0.

As a result of determination in step S540, if the value obtained by subtracting the absolute value of the first reference signal from the absolute value of the second reference signal is equal to or greater than 0, the microphone input signal control device 200 removes echo from the microphone input signal using the second reference signal (S550).

On the other hand, if the value obtained by subtracting the absolute value of the first reference signal from the absolute value of the second reference signal is less than 0 as a result of determination in step S540, the microphone input signal control device 200 removes echo from the microphone input signal using the first reference signal (S560).

Further, the microphone input signal control device 200 removes noise from the signal from which the echo has been removed in step S55 or step S560 and performs equalization (EQ) processing (S570).

In addition, the microphone input signal control device 200 transmits an audio signal to the external server or external device or executes a voice command on the basis of the signal on which noise removal and equalization processing have been performed in step S570 (S580).

Figure 6:
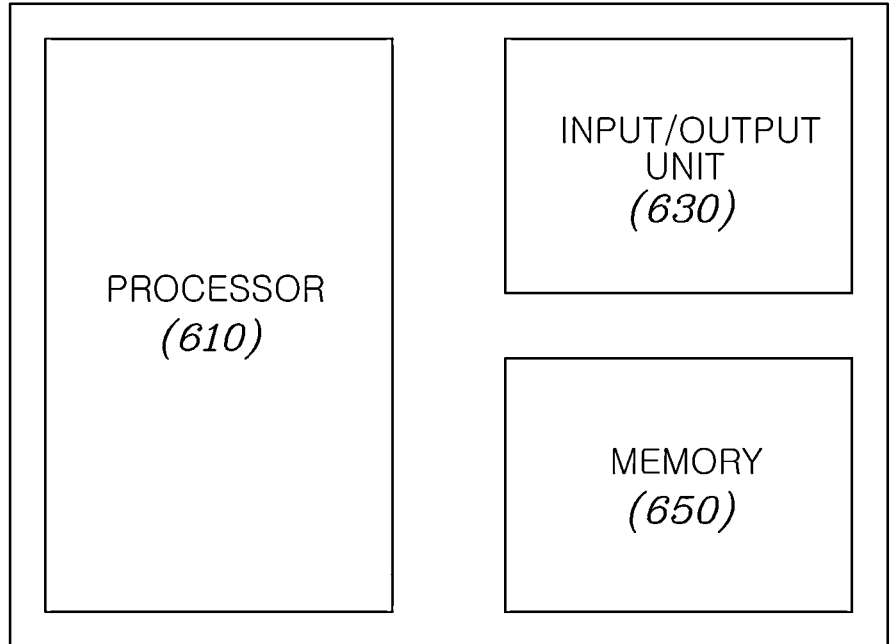
FIG. 6 shows a computer system according to an embodiment of the present disclosure.

FIG. 6 shows a computer system according to an embodiment of the present disclosure.

Referring to FIG. 6, embodiments of the present disclosure may be implemented in a computer system such as a computer-readable recording medium. As shown in FIG. 6, the computer system 600 includes a processor 610, an input/output unit 630, and a memory 650.

The processor 610 implements the method of controlling a microphone input signal in a vehicle proposed in this specification. Specifically, the processor 610 implements all operations of the echo cancellation and noise reduction unit 210, the media signal processor 250, and the digital signal processor 270 in the embodiments disclosed herein and performs all operations of the method of controlling a microphone input signal control shown in FIG. 5.

For example, the processor 610 generates the first reference signal based on a sound signal received from the communication unit 230, generates the second reference signal based on a signal obtained by removing noise from the sound signal and performing equalization processing thereon, and removes echo from the microphone input signal using the first or second reference signal on the basis of a result of comparison between the first and second reference signals.

Here, the first and second reference signals are complex numbers including a real part and an imaginary part, and the processor 610 can remove the echo from the microphone input signal using the first or second reference signal on the basis of a result of comparison between the absolute value of the first reference signal and the absolute value of the second reference signal.

Here, if the value obtained by subtracting the absolute value of the first reference signal from the absolute value of the second reference signal is equal to or greater than 0, the processor 610 can remove the echo from the microphone input signal using the second reference signal.

If the value obtained by subtracting the absolute value of the first reference signal from the absolute value of the second reference signal is less than 0, the processor 610 can remove the echo from the microphone input signal using the first reference signal.

Further, the processor 610 can remove the echo from the microphone input signal using the first or second reference signal on the basis of a result of comparison between the decibel value (dB) of the first reference signal and the decibel value (dB) of the second reference signal.

In this case, if the value obtained by subtracting the decibel value of the first reference signal from the decibel value of the second reference signal is equal to or greater than 0, the processor 610 can remove the echo from the microphone input signal using the second reference signal.

If the value obtained by subtracting the decibel value of the first reference signal from the decibel value of the second reference signal is less than 0, the processor 610 can remove the echo from the microphone input signal using the first reference signal.

Further, the processor 610 may remove noise from the signal from which the echo has been removed from the microphone input signal and perform equalization (EQ) processing thereon.

Here, the processor 610 may transmit the noise-removed and equalized signal to an external server or an external device.

Further, the processor 610 may execute a voice command based on the noise-removed and equalized signal.

The input/output unit 630 receives a sound signal from an external server or an external device and receives a microphone input signal through the microphone.

The memory 650 may be various types of volatile or non-volatile storage media. The memory 650 stores at least one of a sound signal received from the external server or external device, the first and second reference signals, the microphone input signal, or a combination thereof.

According to the embodiments of the present disclosure described above, it is possible to accurately transmit a driver's voice by strengthening a reference signal and curbing echo occurrence.

Meanwhile, the above-described embodiments of the present disclosure can be implemented as computer-readable code on a program-recorded medium. Computer-readable media includes all types of recording devices that store data that can be read by a computer system. Examples of computer-readable media include a hard disk drive (HDD), a solid state drive (SSD), a silicon disk drive (SDD), a ROM, a RAM, a CD-ROM, a magnetic tape, a floppy disk, an optical data storage device, and the like. Accordingly, the above detailed description should not be construed as restrictive in all respects and should be considered illustrative. The scope of the present disclosure should be determined by reasonable interpretation of the appended claims, and all changes within the equivalent scope of the present disclosure are included in the scope of the present disclosure.

According to various embodiments of the present disclosure as described above, it is possible to accurately transmit a driver's voice by strengthening a reference signal and curbing echo occurrence.

The effects that can be obtained from embodiments of the present disclosure are not limited to the effects mentioned above, and other effects not mentioned can be clearly understood by those skilled in the art from the description below.

What is claimed is:

1. A method of controlling a microphone input signal in a vehicle, the method comprising:
  receiving a sound signal from an external server or an external device;
  generating a first reference signal based on the sound signal and generating a second reference signal based on a signal obtained by removing noise from the sound signal and performing equalization;
  receiving the microphone input signal through a microphone; and
  removing an echo from the microphone input signal by comparing magnitudes of the first reference signal and the second reference signal, and selectively applying one of the first reference signal and the second reference signal based on a quantitative comparison result.

2. The method of claim 1, wherein:
  the first reference signal and the second reference signal are complex numbers including a real part and an imaginary part; and
  removing the echo from the microphone input signal comprises removing the echo from the microphone input signal using the first reference signal or the second reference signal based on a result of comparison between an absolute value of the first reference signal and an absolute value of the second reference signal.

3. The method of claim 2, wherein removing the echo from the microphone input signal comprises removing the echo from the microphone input signal using the second reference signal in a case in which a value obtained by subtracting the absolute value of the first reference signal from the absolute value of the second reference signal is equal to or greater than 0.

4. The method of claim 2, wherein removing the echo from the microphone input signal comprises removing the echo from the microphone input signal using the first reference signal in a case in which a value obtained by subtracting the absolute value of the first reference signal from the absolute value of the second reference signal is less than 0.

5. The method of claim 1, wherein removing the echo from the microphone input signal comprises removing the echo from the microphone input signal using the first reference signal or the second reference signal based on a result of comparison between a decibel value of the first reference signal and a decibel value of the second reference signal.

6. The method of claim 5, wherein removing the echo from the microphone input signal comprises removing the echo from the microphone input signal using the second reference signal in a case in which a value obtained by subtracting the decibel value of the first reference signal from the decibel value of the second reference signal is equal to or greater than 0.

7. The method of claim 5, wherein removing the echo from the microphone input signal comprises removing the echo from the microphone input signal using the first reference signal in a case in which a value obtained by subtracting the decibel value of the first reference signal from the decibel value of the second reference signal is less than 0.

8. The method of claim 1, further comprising performing noise removal and equalization processing on a signal obtained by removing the echo from the microphone input signal.

9. The method of claim 8, further comprising transmitting the signal on which the noise removal and the equalization processing have been performed to the external server or the external device.

10. The method of claim 8, further comprising executing a voice command based on the signal on which the noise removal and the equalization processing have been performed.

11. A device for controlling a microphone input signal, the device comprising:
  an input/output unit comprising:
    a communication interface configured to receive a sound signal from an external server or an external device; and
    an audio input interface including a microphone and configured to receive a microphone input signal;
  one or more processors; and
  a storage device storing a program to be executed by the one or more processors, the program including instructions for:
    generating a first reference signal based on the sound signal;
    generating a second reference signal based on a signal obtained by removing noise from the sound signal and performing equalization; and
    removing an echo from the microphone input signal by comparing magnitudes of the first reference signal and the second reference signal, and selectively applying one of the first reference signal and the second reference signal based on a quantitative comparison result.

12. The device of claim 11, wherein:
  the first reference signal and the second reference signal are complex numbers including a real part and an imaginary part; and
  the program further includes instructions for removing the echo from the microphone input signal using the first reference signal or the second reference signal based on a result of comparison between an absolute value of the first reference signal and an absolute value of the second reference signal.

13. The device of claim 12, wherein the program further includes instructions for removing the echo from the microphone input signal using the second reference signal in a case in which a value obtained by subtracting the absolute value of the first reference signal from the absolute value of the second reference signal is equal to or greater than 0.

14. The device of claim 12, wherein the program further includes instructions for removing the echo from the microphone input signal using the first reference signal in a case in which a value obtained by subtracting the absolute value of the first reference signal from the absolute value of the second reference signal is less than 0.

15. The device of claim 11, wherein the program further includes instructions for removing the echo from the microphone input signal using the first reference signal or the second reference signal based on a result of comparison between a decibel value of the first reference signal and a decibel value of the second reference signal.

16. The device of claim 15, wherein the program further includes instructions for removing the echo from the microphone input signal using the second reference signal in a case in which a value obtained by subtracting the decibel value of the first reference signal from the decibel value of the second reference signal is equal to or greater than 0.

17. The device of claim 15, wherein the program further includes instructions for removing the echo from the microphone input signal using the first reference signal in a case in which a value obtained by subtracting the decibel value of the first reference signal from the decibel value of the second reference signal is less than 0.

18. A device for controlling a microphone input signal, the device comprising:

an input/output unit comprising:

a communication interface configured to receive a sound signal from an external server or an external device; and an audio input interface including a microphone and configured to receive a microphone input signal;

one or more processors; and a storage device storing a program to be executed by the one or more processors, the program including instructions for:

generating a first reference signal based on the sound signal;

generating a second reference signal based on a signal obtained by removing noise from the sound signal and performing equalization;

removing an echo from the microphone input signal by comparing magnitudes of the first reference signal and the second reference signal, and selectively applying one of the first reference signal and the second reference signal based on a quantitative comparison result; and performing noise removal and equalization processing on a signal obtained by removing the echo from the microphone input signal.

19. The device of claim 18, wherein the program further includes instructions for transmitting the signal on which the noise removal and the equalization processing have been performed to the external server or the external device.

20. The device of claim 18, wherein the program further includes instructions for executing a voice command based on the signal on which the noise removal and the equalization processing have been performed.

\* \* \* \* \*